Feb. 14, 1961 A. MORVAI ET AL 2,971,796
BABY CARRIAGE
Filed Nov. 24, 1958 2 Sheets-Sheet 1
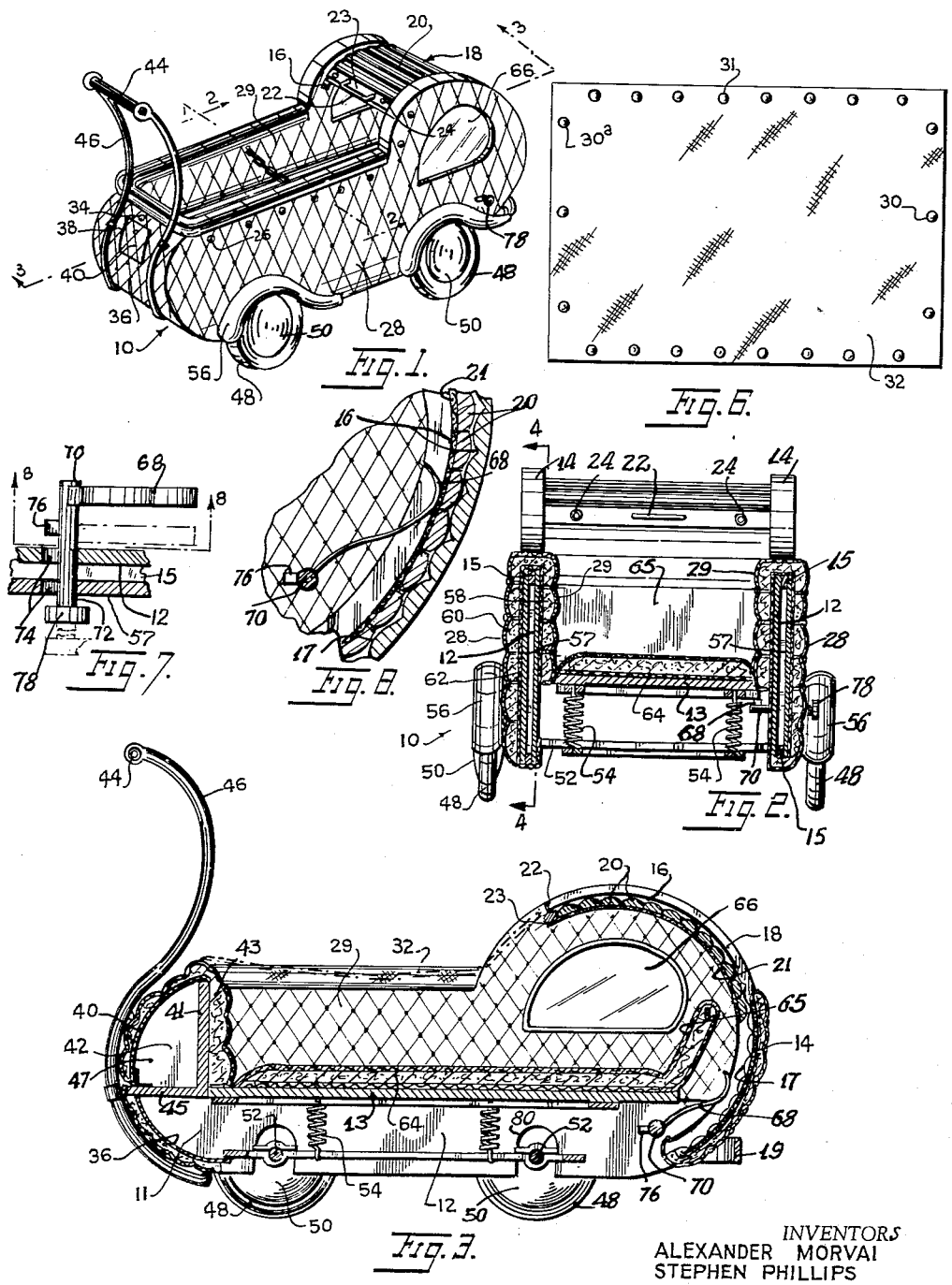
INVENTORS
ALEXANDER MORVAI
STEPHEN PHILLIPS
BY
ATTORNEY Feb. 14, 1961   A. MORVAI ET AL   2,971,796
BABY CARRIAGE Filed Nov. 24, 1958   2 Sheets-Sheet 2

INVENTORS
ALEXANDER MORVAI
STEPHEN PHILLIPS
BY
ATTORNEY

2,971,796
BABY CARRIAGE

Alexander Morvai and Stephen Phillips, both of 3953 58th St., Woodside, N.Y.

Filed Nov. 24, 1958, Ser. No. 776,048

2 Claims. (Cl. 296—28)

This invention concerns an improvement in baby carriage constructions.

It is a principal object of the invention to provide a baby carriage with a roll top hood at one end thereof.

It is a further object of the invention to provide a baby carriage with means for facilitating the adjustment and positioning of a blanket in a baby carriage.

It is a still further object to provide a baby carriage with a roll top hood especially adapted for adjusting and positioning of a blanket in a baby carriage.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a baby carriage embodying one form of the invention.

Fig. 2 is a sectional view on an enlarged scale taken on line 2—2 of Fig. 1.

Fig. 3 is a sectional view on a still further enlarged scale taken on line 3—3 of Fig. 1.

Fig. 6 is a bottom plan view of a blanket suitable for use with the carriage.

Fig. 7 is an enlarged detail view of the roll top locking device shown in unlocking position in full lines and in locking position in dot-dash lines, parts being omitted.

Fig. 8 is a sectional view taken on the line 8—8 of Fig. 7, on an enlarged scale.

Figure 4:
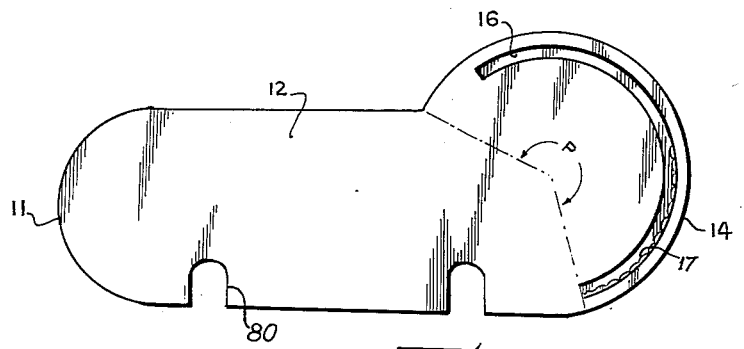
Fig. 4 is an elevational view of a side wall of the carriage, looking from the inside thereof.
Figure 5:
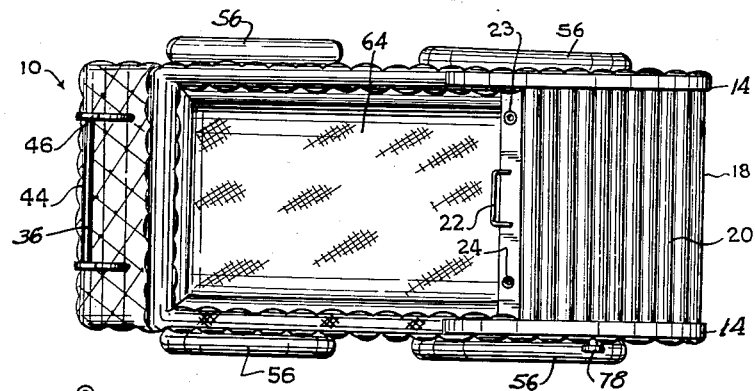
Fig. 5 is a top plan view of the carriage.

Referring to Figs. 1–5, there is shown a carriage 10 with a body having a bottom panel 13 and two upstanding parallel inner side walls 12. The walls have rounded front ends 11 and rear ends 14, with the rear ends 14 enlarged and having a generally circular curvature. A rear bumper 19 may be provided behind the rear ends 14. The groove is slightly wider than the width of the bars 20, and the outer wall of the groove for substantially the lower half thereof is formed with undulations 17 as shown in Fig. 4. The curvature angle P, indicated by dotted lines in Fig. 4, of the rear ends, extends through substantially 240° of an arc. Formed in the inner surface of the enlarged end of each wall 12 is an arcuate groove 16. Slidably mounted in the grooves 16 is a roll top structure 18 formed by a plurality of juxtaposed bars 20 secured flexibly to each other. The bars have flat bottoms secured to a strip of fabric 21. The ends of the bars rest on the inner walls of the groove 16 and the bars are adapted to be pushed downwardly along said inner walls as a trackway and pulled upwardly therealong by a handle 22 mounted on the top end bar 23 of the roll top structure.

Two snap fastener elements 24 are mounted on bar 23 on opposite sides of handle 22. Further snap fastener elements 26 are disposed in spaced alignment on the outer sides of wall coverings 28 mounted over the side walls 12 of the carriage body. These fastener elments 24 and 26 are intended to engage mating fastener elements 30 and 31, respectively, disposed along the edges of a generally rectangular blanket 32 best shown in Fig. 6. Blanket 32 has further end fastener elements 30ª.

A group of fastener elements 34 are disposed at the top of the curved front wall 36 of the carriage. This wall is provided with an opening 38 in which is fitted a hinge mounted door 40 serving as a closure for a compartment 42 in the front of the carriage. The compartment is provided for the storage of milk bottles, food and other infant necessities. The compartment has a rear wall 41 covered by padding 43, a bottom wall 45 and side walls 47. The carriage is provided with a handle bar 44 supported on curved arms 46. The carriage has pneumatic tires 48 on the wheels 50. Axles 52 support the body of the carriage which is mounted on springs 54 attached to the axles. Guards 56 are disposed over the wheels. The side walls of the body of the carriage may each be fabricated with an outer wall member 57 spaced from the inner wall 12 by a spacer member 15. The inner and outer wall members may be covered with cotton padding 58 and 60 overlaying fabric bases 62. The inner paddings 58 are covered with leather or plastic covers 29. The bottom panel 13 of the carriage body is covered by a padding 64. At the rear of the carriage the padding 64 is bent upwardly at a slant to provide a back rest 65. A window 66 is provided in each side of the body of the carriage at the rear.

In use, the blanket 32 will have its end snap fasteners 30ª respectively engaged with the front fastener elements 34 on the front wall 36 of the carriage body and the roll top 18 will be pulled forwardly to the top ends of grooves 16. The fasteners 30 on the other end of the blanket will be engaged with fasteners 24 on the roll top 18 so that the blanket will hang in the slack position shown in dotted lines in Fig. 3. Upon retraction of the roll top 18, the blanket will be pulled taut so that its side snap fasteners 31 overhang the side fasteners 26 on the carriage body. After the side fasteners are engaged, the fasteners 30 and 24 may be disengaged to free the roll top so that it can be used as an adjustable closure for the rear end of the carriage.

In use as an adjustable closure for the rear end of the carriage, when it is desired to open the rear end of the carriage to provide ventilation for the infant in the carriage, the roll top 18 is adapted to be bodily slid and pulled bodily along the grooves 16 by means of the handle 22, the width of the grooves permitting this operation. When the lowermost bar 20 reaches the undulations 17 in the grooves, a slight friction is encountered between the bars and undulations but not sufficient to prevent farther downward travel of the roll top to lowermost position when the rear end of the carriage is fully open.

A spring finger 68 has one end fixed on a stub shaft 70 rotatably and slidably mounted in aligned openings 74, in the wall members 12 and 57, respectively, on one side of the body of the carriage. The other end of the spring finger is curved and extends slightly into the adjacent groove 16 in the path of movement of the roll top. A short detent member 76 extends from the stub shaft in a direction opposite to the direction of extension of the spring finger. The roll top encounters the spring finger but owing to the rotatable mounting thereof, the roll top is permitted to travel past the spring finger. However, when the roll top is in lowermost position and the rear end of the carriage is in fully open position, the stub shaft 70 may be pulled outwardly by means of a knob 78 on the outer end thereof, carrying the detent member into the opening 74 in the wall member 57. Coaction between the detent member and wall of the opening 74 prevents any further rotation of the stub shaft whereby the spring finger is pressed against the roll top, and the bars 20 of the roll top opposite the spring finger pressed between the undulations 17 so that the roll top is held against accidental displacement liable to be caused by erratic movement of the carriage over rough terrain. In order to retract the roll top, it is merely necessary to push the stub shaft 70 inwardly to carry the detent member 76 out of the opening 74 in wall member 57 to permit rotation of the shaft.

Figure 9:
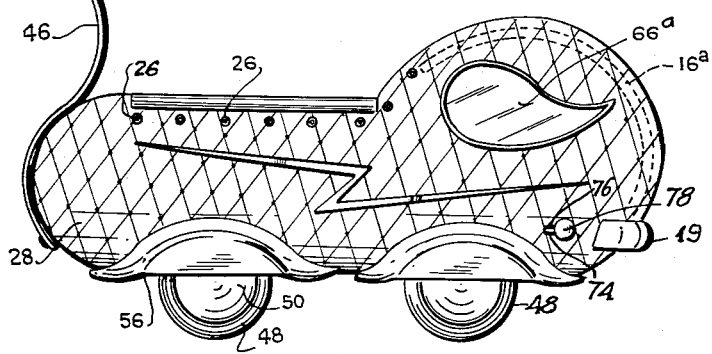
Fig. 9 is a side elevational view of a modification of the invention.

In Fig. 9 there is shown a modified carriage structure in which the grooves 16a are longer and less sharply curved than grooves 16 in the carriage of Figs. 1–5. In other respects, the carriage structure of Fig. 9 is equivalent to that of the carriage of Figs. 1–5. A roll top similar to that of roll top 18 is mounted in the grooves 16a for retraction and adjustment of the opening in the top of the carriage. If desired, windows 66a can be provided in the sides of the carriage body underneath the grooves 16a. Recesses 80 are provided in the lower end of inner walls 12 to receive the axles when the carriage body rocks and swings on springs 54.

While we have illustrated and described the preferred embodiments of our invention, it is to be understood that we do not limit ourselves to the precise constructions herein disclosed and that various changes and modifications may be made within the scope of the invention as defined in the appended claims.

Having thus described our invention, what we claim as new, and desire to secure by United States Letters Patent is:

1. In a baby carriage, a pair of parallel side wall structures, each side wall structure constituted by a pair of closely spaced inner and outer wall members, each side wall structure having upstanding enlarged rear end portions with grooves respectively opening inwardly in opposed relation, a roll top constituted by a plurality of parallel bars pivotally secured to each other, said roll top slidably disposed in said grooves and providing a retractable hood for the carriage, one side wall structure having an opening extending through the wall members thereof, a stub shaft extending loosely through said opening and rotatably and slidably mounted therein, an elongated curved spring finger secured at one end to said stub shaft inside the wall structure, the other end of said spring finger adapted to engage said roll top for holding same against movement, means on the outer end of the stub shaft for moving said stub shaft for carrying said spring finger into and out of holding engagement with the roll top, and means associated with the stub shaft for preventing movement of the spring finger into holding engagement.

2. In a baby carriage, a pair of parallel side wall structures, each side wall structure constituted by a pair of closely spaced inner and outer wall members, each side wall structure having upstanding enlarged rear end portions with grooves respectively opening inwardly in opposed relation, a roll top constituted by a plurality of parallel bars pivotally secured to each other, said roll top slidably disposed in said grooves and providing a retractable hood for the carriage, one side wall structure having an opening extending through the wall members thereof, a stub shaft extending loosely through said opening and rotatably and slidably mounted therein, an elongated curved spring finger secured at one end to said stub shaft inside the wall structure, the other end of said spring finger adapted to engage said roll top for holding same against movement, a knob on the outer end of the stub shaft for moving said stub shaft for carrying said spring finger into and out of holding engagement with the roll top, a detent member secured at one end to the stub shaft adjacent the inner wall member of the adjacent side wall structure, said detent member extending in a direction opposite to the direction of extension of the spring finger, said detent member adapted to be slid by said knob into interlocking engagement with the opening in said inner wall member for holding the stub shaft against turning movement.

References Cited in the file of this patent

UNITED STATES PATENTS

| | | |
|---|---|---|
| 1,758,110 | Hamel | May 13, 1930 |
| 1,815,952 | Morriss | July 28, 1931 |
| 2,257,943 | Feldman | Oct. 7, 1941 |
| 2,552,453 | Pintar | May 8, 1951 |

FOREIGN PATENTS

| | | |
|---|---|---|
| 125,850 | Great Britain | May 1, 1919 |
| 267,363 | Great Britain | Mar. 17, 1927 |
| 375,962 | Great Britain | July 7, 1932 |
| 450,725 | Italy | Aug. 9, 1949 |